Oct. 18, 1960 C. W. ROOP ET AL 2,956,310
CASTING OF THIN CELLULAR RESIN SHEETS
Filed June 5, 1957
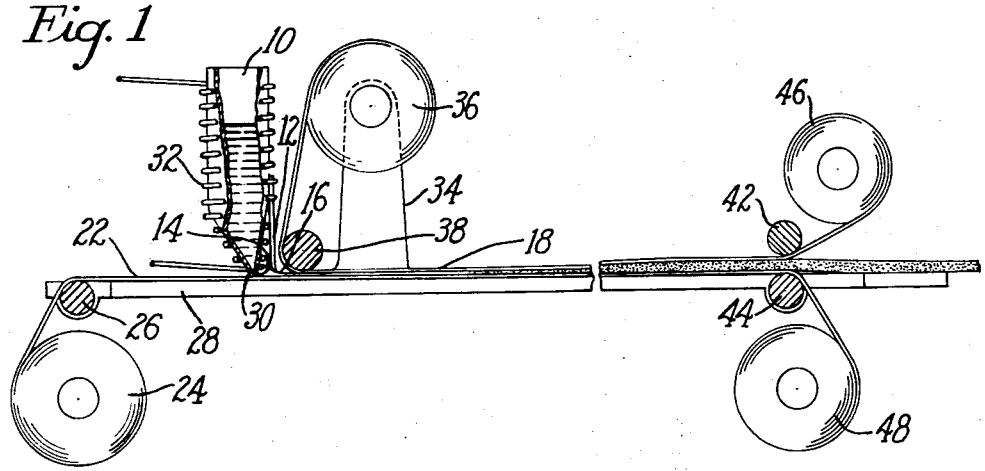
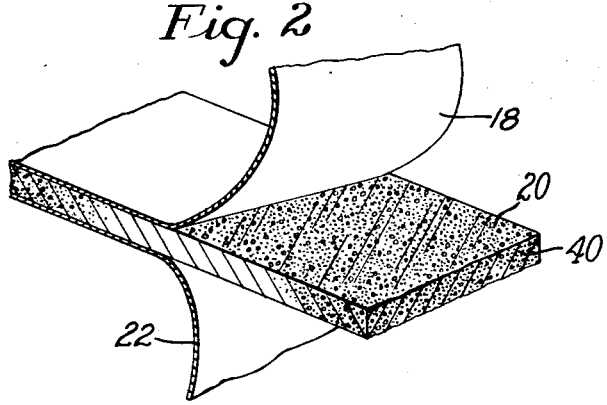
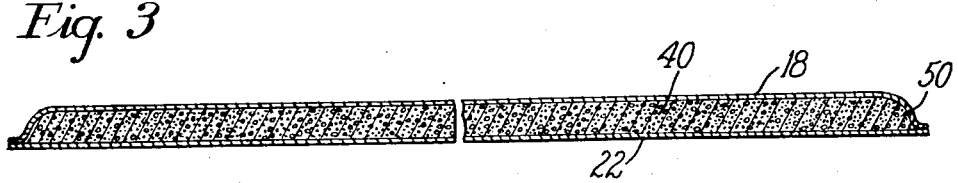
Inventors
Cyril W. Roop
Stephen E. Urban
By their Attorney

2,956,310
CASTING OF THIN CELLULAR RESIN SHEETS

Cyril W. Roop, Reading, and Stephen E. Urban, Melrose, Mass., assignors to B.B. Chemical Co., Boston, Mass., a corporation of Massachusetts Filed June 5, 1957, Ser. No. 663,786

8 Claims. (Cl. 18—57)

This invention relates to the casting of thin cellular resin sheets and particularly to a continuous process for the casting of thin cellular polyurethane resin sheets.

Because of the desirable properties of polyurethane resin foams, it has been found possible to use very thin layers of this cellular material to achieve characteristics previously requiring much thicker layers of other materials. In general, these thin cellular sheets of resin have been made by slicing thick slabs of the foamed material to the desired dimensions. This has been necessary due to a number of factors of which one of the most important is that the upper surface of cast urethane foam develops a thick irregular rind so that for uniform structure it has been necessary to discard this upper portion. Layers foamed from a thin deposit of reactive materials have been little more than solid polyurethane with bubbles irregularly distributed. A second major difficulty in previous efforts to form thin foam sheets has been that in the course of spreading the reaction mixture some portions of the mixture react to form bubbles or foam in the reservoir or bank of material prior to spreading, and these bubbles or the foam cause irregularities in spreading which render whole sections of the deposited sheet useless. This difficulty cannot be cured effectively by the use of known delay type reaction catalysts since even though they enable uniform coating for a limited period, the recirculation of portions of the reaction mixture in the reservoir or bank before the spreader allows time for foaming to begin.

It is a feature of the present invention to provide a continuous process for casting thin cellular resin sheets particularly polyurethane resin sheets in which the difficulties of thick rind formation and irregularities due to premature foaming have been eliminated.

We have found that thin uniform sheets of cellular resin free from the thick rind may be formed by laying down a light impervious cover sheet on and in wetting contact with the layer of resin to be foamed before foaming has begun. In combination with this elimination of the rind, a thin layer may be deposited without premature foaming before the spreading step by chilling the reaction mixture and maintaining the temperature of the mixture prior to spreading below the temperature at which the gas developing reaction will proceed but at a temperature sufficiently high to give to the liquid a spreadable viscosity. In thin layers heat penetrates throughout the layer uniformly so that uniform development of gas and expansion of the layer occurs and the resin becomes firm or cures uniformly. Sections which on expansion reach a cross section greater than about 2″ require special techniques since the thickness of such layers resists penetration of heat uniformly into the mass and may cause a doughy unsatisfactorily blown product.

The invention will be described further in connection with the drawings forming part of the disclosure of the invention, in which:

Fig. 1 is a diagrammatic view in cross section of an arrangement of apparatus set up to practice the method of the present invention;

Fig. 2 is an angular view of a foamed thin sheet resin material produced according to the method of the present invention; and Fig. 3 is an end view of a sheet material produced according to the present invention illustrating particularly the ability of the method to provide thin cellular sheets having tapered edges in which uniform cell structure extends to the very edge of the sheet.

The present method presents a combination of steps and conditions which cooperate in a special manner for the production of thin foam resin sheets. The method is of particular advantage in the manufacture of thin cellular polyurethane resin sheets and the following discussion will be directed primarily to this field; but it is to be understood that at least some of the features are useful in casting other thin cellular resin sheets.

A primary concern in the casting of thin foam resin sheets is spreading the resinous material in a layer of uniform thickness. To obtain a layer of uniform thickness the resinous material must be a liquid having a viscosity suitable for spreading and must be uniform in consistency. Evolution of blowing gas before spreading gives non-uniform viscosity and must be prevented. According to the present method the blowing resin composition is kept in a chilled reservoir 10 cold enough to prevent or delay materially evolution of gas but not so cold as to make the resin too viscous for spreading. The spreading equipment, e.g. the spreader knife 12, is also kept cold so that no gas develops, for example in the bank 14 of material before the spreader knife 12.

In combination with the requirement that the material be kept cold to enable the spreading of a uniform layer 16 is the second factor that the applied layer must be thin. Thick layers do not take up heat uniformly throughout their mass so that, for example in a polyurethane resin foam, the blowing action in a thick layer of cold resin would not take place uniformly throughout, and the setting and curing of the foam would be unsatisfactory. Thus the foamable resin mix must be cold so that gas is not liberated in order that the resin mix may be spread in a uniform thin layer and the layer of cold resin must be thin in order to foam properly.

The deposited resin layer 16 must be covered or enclosed in a substantially impervious skin or cover film 18 before foaming begins since otherwise the small bubble structure breaks down. It is important that the resin be applied in delayed foaming condition in order that the enclosing skin may be laid down before foaming since otherwise large bubbles or openings form through breaking down of small bubbles. It is important that the cover film 18 be applied to the thin layer 16 since otherwise evolved gas which causes "blow" readily escapes from the uncovered surface of the layer 16 and after it escapes a thick rind forms or, in the case of a very thin layer 16, the resin layer 16 forms a substantially unblown, although cured or chemically converted, resin sheet. Particularly with the polyurethane resin foaming materials, the cover film 18 is believed to prevent escape of minute quantities of water vapor and catalyst as well as the blowing gas and this retained water vapor and catalyst insure that the reaction goes to completion from surface to surface of the resin layer with formation only of an almost imperceptible skin 20 on the surface of the resin and with maximum foam generation from the reagents and catalyst employed.

The general procedure may be carried out by hand but is also adapted to use with a variety of apparatus. The method will be described more fully as it is practiced in the apparatus shown in the drawing. That apparatus includes a reservoir 10 and spreader knife 12 disposed to apply a thin layer of fluid resin from the reservoir 10 to a casting surface 22 therebeneath. Many types of casting surface might be used including stainless steel endless belts; but in the form shown in the figure the casting sheet 22 is a silicone treated casting paper, e.g. glassine, which is unwound from the roll 24 and passed around the roller 26 to the surface of the table 28.

A foamable resinous composition for application to the casting sheet 22 is prepared according to usual methods with the exception that the mixing is carried on at temperatures below those at which evolution of gas to form a foam will proceed or the mixing is carried out and thereafter chilled, before evolution of gas, to a temperature below that at which the gas liberating action occurs. This chilled mixture is kept at low temperature until ready for use.

For use, the chilled mixture is adjusted to a temperature at which no blowing will occur during the spreading operation but which is warm enough so that the mixture is spreadable. This temperature-adjusted mix is supplied to the reservoir 10 of the spreading equipment in which it can be kept chilled until spread. As shown in Fig. 1, the reservoir 10 is a simple container with an opening 30 in its lower portion for depositing resin on the casting sheet 22 and with refrigerating coils 32 around it to keep the reservoir 10 and its contents cold. From the reservoir 10 the chilled resin mixture passes through the opening 30 to the surface of a casting sheet 22 which passes beneath the reservoir. Immediately subsequent to the point of deposition of the resin on the casting sheet 22 there is disposed a chilled spreader knife 12 maintained by the refrigerating coils 32 at a temperature which will prevent blowing of the resin mixture. The spreader knife 12 distributes the resin mixture as a uniform layer 16 on the surface of the casting sheet 22, excess resin building up as a bank 14 of material on the reservoir side of the spreader knife 12. The chilled spreader knife 12 maintains the temperature of the resin circulating in this bank 14 of material at a temperature at which no foaming occurs. The spreader knife 12 will be adjusted to provide a layer 16 of chilled resin mix on the casting sheet 22 having a thickness to form the desired thickness of the foamed resin. In general it is preferred to form foamed layers from 1/32 inch to 1 inch but foamed layers as thick as 2 inches may be formed. Blow ratios, i.e. ratios of thickness of deposited resin layer to thickness of foamed layer, are different for different mixes; and the thickness of the deposited resin layer is determined by dividing the desired foam thickness by the blow ratio.

A thin, light, flexible, substantially continuous cover sheet 18 is laid down on the surface of the resin layer 16 on the casting sheet 22. Simple cover sheet applying devices may be used such as that shown in Fig. 1 comprising a standard 34 in which the ends of a roll 36 of cover sheet material 18, e.g. polyethylene, are rotatably mounted. The cover sheet material is unrolled from this roll and passes around the roller 38 which lays it down in allover wetting contact with the layer 16 of resin mixture which has been spread on the surface of the carrier sheet 22. It is important that the cover sheet 18 be in all-over wetting contact with the surface of the resin layer 16 and that it be laid on the resin layer before evolution of gas and preferably as soon as possible after the layer is deposited.

The assembly of casting sheet 22, resin mixture layer 16, and cover sheet 18 passes forward along the table 28 and takes up heat from its surroundings. The temperature of the resin mix rises and causes development of foam and setting of the resin itself to a firm condition. With some foamable resin mixtures atmospheric temperature alone may be sufficient, while with other mixtures it may be necessary to apply additional heat.

The casting sheet 22 and the cover sheet 18 constitute in effect a closed mold completely filled by the foamable resin mixture. There are no free surfaces of the resin mixture from which blowing gas, catalyst, or reagents can escape and at the same time, since the cover sheet 18 may be substantially weightless, almost theoretical blow of the resin mix is obtained.

After blowing and setting of the resin to a firm condition, the cover sheet 18 and/or the casting sheet 22 may be stripped away from the sheet 40 of foamed cellular resin material. This may be accomplished by pulling the cover sheet 18 and casting sheet 22 against the upper roller 42 and lower roller 44 respectively and winding the cover sheet 18 and casting sheet 22 in rolls 46 and 48 respectively. This cellular resin sheet 40 has an almost imperceptible substantially continuous film 20 at the surfaces which were in contact with the casting sheet and/or the cover sheet and demonstrates an extremely regular cell structure through the body of the sheet even out to thin tapered edges.

A wide variety of known, foam forming resin mixtures may be formed into cellular resin sheets by the method outlined above. Formulations may be chosen to give soft and flexible, semi-rigid or rigid foams. Preferred resin mixtures are compositions containing reaction products of a di- or polyisocyanate and a material having more than one active hydrogen. Useful isocyanate materials include toluene diisocyanate, metaphenylene diisocyanate, meta tolylene diisocyanate 3,3, bitolylene 4,4 diisocyanate, para phenylene diisocyanate, 1 chloro 2,4 phenylene diisocyanate, 3,3 dimethyl 4,4 diphenyl diisocyanate. Any material having two or more active hydrogen atoms may be used. For example, as disclosed in the prior art polyesters, polyesteramides, polyalkylene glycols, polyoxyalkylene glycols and natural products such as castor oil and its derivatives having reactive, preferably terminal, hydroxyl groups or carboxyl groups may be reacted with the di- or polyisocyanate. The di- or polyisocyanate is employed in amount more than sufficient to provide —NCO groups for reaction with all the active hydrogen atoms and the partial reaction products or prepolymers will contain —NCO groups for subsequent gas forming and cross linking reaction. In general the mixture should be compounded to provide at least about 1.2 —NCO groups to each active hydrogen group and the preferred range is from 2:1 to 10:1. The partial reaction products are mixed with water and catalyst such as organic, preferably tertiary, amines, or other alkaline materials, to form a fluid composition having desirable uniform viscosity characteristics for spreading, foamable at room temperature or above, and capable of being brought to a nonfoaming but still spreadable state by cooling. Other compositions which may be used are mixtures of a blowing agent with a setting fluid resin composition such as a plastisol, i.e. a dispersion of resin particles in a liquid plasticizer which does not dissolve the particles at normal temperatures but does dissolve them with formation of a solid plasticized resin body at higher temperatures. Other foaming hardenable fluid compositions may be used.

Where the foaming will occur at room temperature or only slightly elevated temperature, thin sheet polyethylene resin, e.g. from about 1 to 10 mil thickness, has been found ideal as a cover sheet since it is light and very flexible. Where higher temperatures must be used to effect blowing and setting of the resin, light impervious sheets, such as polytetrafluoroethylene or polychlorotrifluoroethylene resin sheets, which are more resistant to temperature, will be used. Light paper, glassine or other sheet treated with a release agent, such as silicone, polyethylene or wax, to which resin foamed in contact with it will not adhere, may also be used.

A useful casting sheet is a glassine sheet or a highly calendered paper, e.g. calendered kraft paper sheet, these sheets being provided with anti-stick coating such as silicone lubricants. However, any of the conventional cast-contact. The resin coating foamed and expanded to a uniform cellular condition and was allowed to stand overnight. The polyethylene resin sheet was stripped from the foamed resin and the resin was then cured for 2½ hrs. at 93.3° C. The resulting film was uniform in cell structure to visual inspection, the cells being mainly interconnecting; but there was an extremely thin, almost imperceptible skin on the surface of the foamed sheet from which the polyethylene resin had been stripped. The resulting cured foamed resin sheet was readily stripped from the casting sheet and was strong, elastic and showed good low temperature flexibility. The sheet had an extremely thin, almost imperceptible skin on the surface which had been adjacent the casting sheet.

*Example III*

A plastisol was made by mixing the following ingredients and then blending them finely together on a three roll paint mill:

|  | Parts by weight |
|---|---|
| Polyvinyl chloride (finely ground) | 100 |
| Liquid polymeric polyester plasticizer (Paraplex G-25) | 46 |
| Di (2-ethyl hexyl)hexahydrophthalate (Flexol CC-55 Plasticizer) | 47 |
| Neutral calcium petroleum sulfonate | 3.6 |
| Organic barium compound heat stabilizer for polyvinyl chloride (Harshaw 1-V-4) | 3.0 |
| Blowing agent (N,N'-dimethyl-N,N'-dinitrosoterephthalamide) (70% solution in inert solvent) | 10 |

A portion of this material was spread on silicone treated glassine casting paper by a knife coater adjusted to providing a coating of 0.090" wet thickness. The coated casting paper was placed in an oven at a temperature of 100° C. for 20 minutes to complete the blowing reaction and thereafter placed in a second oven for 20 minutes at 140° to 155° C. to complete the fusing of the resin.

A second portion of the mixed and blended material was spread on silicone treated glassine casting paper as a layer 0.090" wet thickness and a second layer of silicone treated glassine paper was promptly laid down on the surface of the coating. This material was subjected to the same heat treatment as the first portion.

The blown and fused resinous materials produced by heat treatment of the two portions were separated from the glassine paper sheets. It was found that the density of the portion which was blown and fused with one surface free had a density of 25.76 lbs. per cubic foot, while the portion blown and fused between two layers of glassine paper had a density of only 23.21 lbs. per cubic foot. This represents an improvement of blow through use of the cover sheet of approximately 10%.

Having thus described our invention, what we claim as new and desire to secure by Letters Patent of the United States is:

1. The method for casting thin uniform cellular resin bodies which comprises providing a chilled, fluid mixture of a reaction product of a first organic compound having a plurality of active hydrogen groups and an excess over the amount required to react with all of said active hydrogen groups of an organic compound having a plurality of groups of the formula —NCO, together with water and a catalyst for the reaction between the water and said reaction product, the temperature of said mixture being maintained below the temperature at which reaction of the —NCO groups with water in said mixture will proceed at a significant rate but sufficiently high to provide a spreadable viscosity for said fluid mixture, spreading said fluid mixture in a thin layer between substantially impervious surfaces, one of said surfaces being non-adhesive to the resin mixture reacted in contact therewith and the other surface being one to which the resin mixture will form a permanent bond when reacted in contact therewith, said surfaces being brought into substantially over-all wetting contact with said layer prior to development of gas in said layer, raising the temperature of said layer to initiate reaction between said reaction product and water to develop gas to expand said layer and to cause it to become firm as a cellular resin layer, at least one of said surfaces being in free floating relationship on the upper surface of said layer allowing full expansion of said layer and substantially preventing loss of gaseous and volatile materials and rupture of gas cells at the surface of said layer, and thereafter stripping from said layer said surface which is non-adhesive to said reacted resin mixture.

2. The method for casting thin uniform cellular resin bodies which comprises providing a chilled, fluid mixture of a reaction product of a first organic compound having a plurality of active hydrogen groups and an excess over the amount required to react with all of said active hydrogen groups of an organic compound having a plurality of groups of the formula —NCO, together with water and a catalyst for the reaction between the water and said reaction product, the temperature of said mixture being maintained below the temperature at which reaction of the —NCO groups with water in said mixture will proceed at a significant rate but sufficiently high to provide a spreadable viscosity for said fluid mixture, spreading said fluid mixture in a thin layer on a substantially impervious rigid supporting surface to which the resin mixture will adhere, when reacted in contact therewith, laying down a light, flexible, substantially impervious polyethylene resin cover sheet on said layer in allover wetting contact with said layer prior to development of gas in said mixture, raising the temperature of said layer to initiate reaction between said free —NCO groups and water to develop gas to expand said layer and to cause the layer to become firm as a cellular resin layer, said cover sheet being in free floating relationship on the upper surface of said layer allowing full expansion of said layer and substantially preventing loss of gaseous and volatile materials and rupture of gas cells at the surface of said layer, and thereafter stripping said cover sheet from said cellular resin layer.

3. The method for casting thin uniform cellular resin bodies which comprises providing a chilled, fluid mixture of a reaction product of a first organic compound having a plurality of active hydrogen groups and an excess over the amount required to react with all of said active hydrogen groups of an organic compound having a plurality of groups of the formula —NCO, together with water and a catalyst for the reaction between the water and said reaction product, the temperature of said mixture being maintained below the temperature at which reaction of the —NCO groups with water in said mixture will proceed at a significant rate but sufficiently high to provide a spreadable viscosity for said fluid mixture, spreading said fluid mixture in a thin layer, on a substantially impervious supporting surface, laying down a shaped, light, substantially impervious cover sheet non-adhesive to the resin mixture reacted in contact therewith on said layer in substantially allover wetting contact with said layer, said cover sheet substantially retaining its shape, raising the temperature of said layer to initiate reaction between said reaction product and water to develop gas to expand said layer into cellular condition having a surface conforming to the shape of said cover sheet and to cause it to become firm as a cellular resin layer, said cover sheet being in free floating relationship on the upper surface of said layer allowing full expansion of said layer and substantially preventing loss of gaseous and volatile materials and rupture of gas cells at the surface of said layer, and thereafter stripping said cover sheet from said cellular resin layer.

4. A method for casting thin uniform cellular resin bodies which comprises providing a chilled, fluid mixture of the reaction product of an organic compound having ing sheets non-adhesive to resin reacted in contact therewith may be used.

It is possible also to use non-strippable materials as casting or cover surfaces to form composites in which the casting and/or cover surfaces are permanently joined to the foamed resin layer. The following materials bond firmly to isocyanate resin foamed in contact with them: regenerated cellulose, cellulose nitrate, cellulose acetate, cellulose acetate butyrate, ethyl cellulose, vinyl chloride-vinyl acetate copolymer, polyvinyl butyral, polystyrene, modified styrene polymers, rubber hydrochloride, polyamides (nylon), polyesters (polyethylene terephthalate), and vinyl chloride vinylidene chloride copolymers. Metal foil or sheet metal, wood, rigid or flexible plastics and other impervious material may also be used as the casting surface.

It is important that the casting sheet and the cover sheet present a substantially continuous surface as distinguished from a porous fibrous surface such as exists in woven or non-woven fibrous sheets, e.g. cloth or paper. Where porous fibrous sheets are coated with or laid on the foamable mixture, the mixture coats the fibers and the blowing gas escapes into the spaces between the fibers to a substantial extent. Where the casting and cover sheet are substantially continuous surfaces, foamable resin compositions containing fibers, or fibrous sheets coated, as by immersion with foamable resin composition, will form satisfactory resin layers between the casting and cover sheets.

Foamed resin layers may also be formed on a porous or relatively open fibrous carrier sheet such as a fabric by first treating a surface of the porous sheet to form a substantially continuous coating. This coating may be, for example, a coating deposited from a resin emulsion or dispersion deposited on the surface of the porous or open fibrous sheet and subjected to heat to cause the deposited resin to fuse together into a substantially continuous layer having none or only extremely few openings therethrough.

Numerous modifications of the method have been found. Thus it is possible to depress portions of the cover sheet to provide, for example, tapered edges (see Fig. 3) or outlines having tapered edges in the foamed sheet. This may be accomplished with very little pressure since the resin mix is liquid at this point and flows readily from areas subjected to pressure. For example, a "dinking" die as used for cutting leather, but with edges blunted applies sufficient pressure by its weight alone to form a tapered edge shape in a layer giving ½" thick foam. Bands rather than a continuous widthwise layer of the chilled foamable resin mix may be deposited on the casting sheet by a ribbon type extruder or the chilled resin mix may be applied to the casting sheet by stenciling or other printing device, or even by brush prior to laying down the cover sheet on the deposited resin. A shaped or contoured cover sheet or casting sheet formed by folding, draping or impressment may be used to provide a desired contour on a surface of the foamed sheet. Also, prior to final setting up but after blowing and preliminary firming up of the resin, the expanded sheet is formable and the composite of carrier sheet, foamed layer and cover sheet may be pressed or vacuum formed at this stage to provide desired contours of the foamed sheet.

The following examples are given to aid in understanding the invention but it is to be understood that the invention is not limited to the particular materials, conditions or procedures of the examples:

Example I 95 grams of an 80:20 mixture of the 2,4 and 2,6 isomers of toluene diisocyanate were placed in a reaction vessel. To the toluene diisocyanate there were added 450 grams of polypropylene glycol having an average molecular weight of 2000. The materials reacted with evolution of heat and mixing was continued until a temperature peak was reached and then dropped back about 5° C., at which time the mixture was heated with stirring to 140° C. The mixture was cooled to 50° and analyzed for NCO groups. Further toluene diisocyanate to the extent of 82 grams was added with stirring to bring the free NCO group content up to about 10%. To the resulting mixture 3 grams of a fluid silicone oil of 50 centistoke @ 25° C. viscosity was added and mixed in. The resultant batch weight was about 627 grams. 13.4 grams of cold distilled water were combined with 9.4 grams of N-methyl morpholine and 0.65 gram of triethylamine. This mixture was cooled to about 0° C. and the free NCO containing mixture was also cooled to this temperature. These chilled materials were rapidly mixed together.

The chilled mixture was placed in a chilled knife spreader and a sheet of silicone treated glassine was drawn beneath the spreader at the rate of about 5 yards per minute. The doctor blade of the spreader was set to give a coating of .025."

Directly after the spreader, a two mil sheet of polyethylene resin from the supply roll was laid down to cover the surface of the resin coating on the glassine sheet. Care was taken that the polyethylene sheet entered into allover wetting contact with the surface of the resin coating. The temperature of the resin coating was allowed to rise through contact with the surrounding air and the surface supporting the glassine sheet. In approximately 2½ minutes evolution of gas within the resin coating began and the resin coating foamed and expanded reaching an ultimate thickness of 0.530". Thereafter the polyethylene sheet and the glassine sheet were stripped from the foamed resin layer and the foamed resin layer was cured for 2 hrs. at 110° C. to form a strong, light colored, elastic foam sheet having good low temperature flexibility. The cell structure was uniform on visual inspection and comprised mainly interconnected cell structure except for a very thin, almost imperceptible skin on both surfaces.

Example II 2000 grams of a commercially available polyester having an average molecular weight of 1800 to 2000, a hydroxyl number of from 55 to 60, an acid number of 3 (calculated as millimeters of potassium hydroxide per gram), a water content of not more than 0.25% and having an average of 2.42 hydroxyl groups per molecule and understood to be an adipate (Paraplex U-148) were combined with 1227 grams of an 80:20 mixture of the 2,4 and 2,6 isomers of toluene diisocyanate. Mixture was effected by introducing the polyester resin with the toluene diisocyanate in a closed glass reactor over a period of 100 minutes. 50 minutes after the end of the addition of the polyester resin exothermic heat had raised the reaction mass to a peak of 39° C. The exothermic reaction was allowed to proceed for another 45 minutes with stirring and the temperature then raised to 100° C. and held for one hour. The resultant material known as a "prepolymer" was then cooled rapidly to 30° C. This material had a free —NCO content of 15.4% by weight of the prepolymer.

5.35 grams of cold water were mixed with 2.50 grams of N-methyl morpholine, 1.25 grams of an emulsifier and 5.30 grams of commerically available orange dye dispersed in polyester resin, and this mixture was combined with 247 grams of the above referred to polyester resin. This mixture and 250 grams of the "prepolymer" were cooled to 10° C., mixed vigorously for two minutes and discharged to a chilled knife type spreader set to provide 0.03" clearance. A silicone treated glassine casting sheet was pulled beneath the spreader at about 5 yards per minute to provide a uniform coating of the mixture on the casting sheet. Directly after the reaction mixture was coated on the casting sheet, a 2 mil polyethylene resin sheet was deposited on the coating in allover wetting a plurality of active hydrogen groups and an excess over the amount required to react with all of said active hydrogen groups of an organic compound having a plurality of groups of the formula —NCO, together with water and a catalyst for the reaction between the water and said product, the temperature of said mixture being maintained below the temperature at which reaction said product to produce gas in said mixture with water will proceed at a significant rate but sufficiently high to provide a spreadable viscosity for said fluid mixture, spreading said fluid mixture in a thin layer on a casting surface, laying down a light, flexible, substantially impervious cover sheet on said layer in allover wetting contact with said layer prior to development of gas in said mixture, pressing portions of said cover sheet toward said casting surface in a determined outline to reduce the thickness of said layer in said pressed portions, raising the temperature of said layer to initiate reaction between said product and water to develop gas to expand unpressed portions of said layer and to cause said unpressed portions of the layer to become firm as a cellular resin layer with tapered edges along said determined outline, said cover sheet in unpressed portions floating on the upper surface of said layer allowing full expansion of said unpressed portions and substantially preventing loss of gaseous and volatile materials and rupture of gas cells at the surface of said layer.

5. The method for continuous casting of thin, uniform, cellular resin sheets which comprises spreading on successive continuous portions of a supporting surface a layer of cool, fluid resin mixture reactive at higher temperatures to develop gas to expand the resin and to become firm to form cellular resin, the temperature of said cool resin mixture being maintained below the temperature at which reaction to develop gas to expand the resin will proceed at a significant rate but sufficiently high to give a spreadable viscosity to the mixture, progressively laying down on said layer in line contact and into allover wetting engagement with said layer a light, flexible, substantially impervious cover sheet prior to development of gas in the resin mixture of said layer, and raising the temperature of successive portions of said layer after they are covered to develop gas to expand the resin and to cause it to become firm as a cellular resin layer, said cover sheet being in free floating relationship on the upper surface of said layer allowing full expansion of said layer and substantially preventing rupture of surface gas cells of said layer during expansion.

6. The method for continuous casting of thin, uniform, cellular resin sheets which comprises depositing on successive continuous portions of a casting sheet a cool, fluid resin mixture reactive at higher temperatures to develop gas to expand the resin and to become firm to form cellular resin, the temperature of said cool resin mixture being maintained below the temperature at which reaction to develop gas to expand the resin will proceed at a significant rate but sufficiently high to give a spreadable viscosity to the mixture, moving a chilled spreading device in spaced relation relative to said casting sheet to distribute the resin mixture as a thin, even layer on said casting sheet, excess portions of said resin mixture over that required to form said layer building up as a circulating bank of material which is kept in chilled condition by said chilled spreader, progressively laying down on said layer in line contact and into allover wetting engagement with said layer a light, flexible, substantially impervious cover sheet non-adhesive to the resin mixture prior to development of gas in the resin mixture of said layer, and raising the temperature of successive portions of said layer after they are covered to develop gas to expand the resin and to cause it to become firm as a cellular resin layer, said cover sheet being in free floating relationship on the upper surface of said layer allowing full expansion of said layer and substantially preventing rupture of surface gas cells of said layer during expansion.

7. The method for continuous casting of thin, uniform, cellular resin sheets which comprises depositing on successive continuous portions of a casting surface a cool, fluid resin mixture of the reaction product of an organic compound having a plurality of active hydrogen groups and an excess over the amount required to react with all of said active hydrogen groups of an organic compound having a plurality of groups of the formula —NCO together with water and a catalyst for the reaction of said water with said product said mixture being reactive at higher temperatures to develop gas to expand the resin and to become firm to form cellular resin, the temperature of said cool resin mixture being maintained below the temperature at which reaction to develop gas to expand the resin will proceed at a significant rate but sufficiently high to give a spreadable viscosity to the mixture, moving a chilled spreading device in spaced relation relative to said surface to distribute the resin mixture as a thin, even layer on said surface, excess portions of said resin mixture over that required to form said layer building up as a circulating bank of material which is kept in chilled condition by said chilled spreader, progressively laying down on said layer in line contact and into allover wetting engagement with, said layer a light, flexible, substantially impervious cover sheet prior to development of gas in the resin mixture of said layer, and raising the temperature of successive portions of said layer after they are covered to develop gas to expand the resin and to cause it to become firm as a cellular resin layer, said cover sheet being in free floating relationship on the upper surface of said layer allowing full expansion of said layer and substantially preventing rupture of surface gas cells of said layer during expansion and thereafter stripping said cover sheet from said cellular resin layer.

8. The method as defined in claim 7 in which the layer of cool fluid resin mixture has a thickness sufficient when expanded by gas to form a layer of cellular resin from 1/32" to 1" in thickness.

References Cited in the file of this patent

UNITED STATES PATENTS

| | | |
|---|---|---|
| 1,776,366 | Novotny | Sept. 23, 1930 |
| 2,096,338 | Randall | Oct. 19, 1937 |
| 2,240,581 | Seward et al. | May 6, 1941 |
| 2,319,042 | De Wyk | May 11, 1943 |
| 2,371,382 | Cuthbertson | Mar. 13, 1945 |
| 2,706,311 | Durst et al. | Apr. 19, 1955 |
| 2,764,565 | Hoppe et al. | Sept. 25, 1956 |
| 2,827,665 | Rogers et al | Mar. 25, 1958 |
| 2,841,205 | Bird | July 1, 1958 |
| 2,872,965 | Sisson | Feb. 10, 1959 |

FOREIGN PATENTS

| | | |
|---|---|---|
| 152,697 | Australia | Aug. 5, 1953 |
| 163,008 | Australia | May 24, 1955 |
| 842,267 | Germany | Sept. 15, 1952 |
| 699,667 | Great Britain | Nov. 11, 1953 |

OTHER REFERENCES

"Mass-Produced Polyurethane Foams," published in Modern Plastics, March 1957, pp. 126–128, 264. (Copy in Scientific Library.)

Badische Anilin- & Soda-Fabrik, German application Serial No. B22954, printed Sept. 6, 1956 (Kl. 39c, 19) (3 pp. spec.; 1 sht. dwg.).

UNITED STATES PATENT OFFICE

CERTIFICATE OF CORRECTION

Patent No. 2,956,310                               October 18, 1960

Cyril W. Roop et al.

It is hereby certified that error appears in the printed specification of the above numbered patent requiring correction and that the said Letters Patent should read as corrected below.

Column 5, line 28, after "satisfactory" insert -- foamed --.

Signed and sealed this 25th day of April 1961.

(SEAL)
Attest:
ERNEST W. SWIDER
Attesting Officer

DAVID L. LADD
Commissioner of Patents